United States Patent
Robson et al.

(10) Patent No.: US 9,398,469 B2
(45) Date of Patent: Jul. 19, 2016

(54) MESH NETWORK EVALUATION METHODS (75) Inventors: Julius Robson, Dunmow (GB); Steven Baines, Bishops Stortford (GB); David Bevan, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 2637 days.

(21) Appl. No.: 11/574,211

(22) PCT Filed: Aug. 25, 2005

(86) PCT No.: PCT/GB2005/003319
§ 371 (c)(1),
(2), (4) Date: Feb. 23, 2007

(87) PCT Pub. No.: WO2006/021791
PCT Pub. Date: Mar. 2, 2006

(65) Prior Publication Data
US 2007/0291660 A1   Dec. 20, 2007

(30) Foreign Application Priority Data

Aug. 25, 2004 (GB) .................................. 0418959.3

(51) Int. Cl.
*H04W 24/00* (2009.01)
*H04W 4/26* (2009.01)
*H04W 92/20* (2009.01)

(52) U.S. Cl.
CPC ................ *H04W 24/00* (2013.01); *H04W 4/26* (2013.01); *H04W 92/20* (2013.01)

(58) Field of Classification Search
USPC ................................................. 370/241–258
See application file for complete search history.

(56) References Cited

U.S. PATENT DOCUMENTS

| | | | | |
|---|---|---|---|---|
| 5,530,575 A * | 6/1996 | Acampora et al. | ............... | 398/58 |
| 5,649,108 A * | 7/1997 | Spiegel et al. | ................ | 709/241 |
| 5,794,128 A * | 8/1998 | Brockel et al. | ............. | 455/67.11 |
| 5,987,011 A * | 11/1999 | Toh | ............................... | 370/331 |
| 6,459,682 B1 * | 10/2002 | Ellesson et al. | ............... | 370/235 |
| 6,865,602 B1 * | 3/2005 | Nijemcevic et al. | .......... | 709/223 |
| 7,054,554 B1 * | 5/2006 | McNamara et al. | ............ | 398/30 |
| 7,149,975 B1 * | 12/2006 | Johnson et al. | ................ | 715/734 |
| 7,277,393 B1 * | 10/2007 | Jacobson et al. | .............. | 370/238 |
| 7,376,084 B2 * | 5/2008 | Raghunath et al. | ........... | 370/233 |
| 2002/0091506 A1 * | 7/2002 | Gruber | ............................ | 703/19 |
| 2003/0058797 A1 * | 3/2003 | Izmailov et al. | .............. | 370/238 |
| 2003/0135645 A1 * | 7/2003 | Oki et al. | ....................... | 709/238 |
| 2004/0042402 A1 * | 3/2004 | Galand et al. | ................. | 370/237 |
| 2004/0064293 A1 * | 4/2004 | Hamilton et al. | .............. | 702/182 |
| 2004/0071090 A1 * | 4/2004 | Corson et al. | ................ | 370/244 |
| 2004/0219922 A1 * | 11/2004 | Gage et al. | .................... | 455/445 |
| 2005/0044229 A1 * | 2/2005 | Brown et al. | .................. | 709/226 |
| 2007/0160181 A1 * | 7/2007 | Barbaresi et al. | ............ | 379/1.01 |

* cited by examiner

*Primary Examiner* — Huy D Vu
*Assistant Examiner* — James P Duffy
(74) *Attorney, Agent, or Firm* — Meyertons, Hood, Kivlin, Kowert & Goetzel, P.C.

(57) ABSTRACT

Methods, software and apparatus for determining the quality of a wireless mesh network (ie a network comprising a plurality of access nodes supporting wireless communications both with user terminals and between themselves), comprises storing information relating to the access nodes, the information including whether or not each access node is a data sink (ie is connected to an external network, typically a wireline network with relatively higher capacity); determining measures of traffic flow on wireless links between said access nodes; determining measures of capacity on the wireless links; and determining the quality of the network in dependence on the stored information, the measures of traffic flow, and the measures of capacity.

22 Claims, 7 Drawing Sheets

MESH NETWORK EVALUATION METHODS

FIELD OF THE INVENTION

This invention relates to methods and apparatus for evaluating mesh networks. The invention is particularly, although not exclusively, related to wireless mesh networks.

BACKGROUND TO THE INVENTION

Recently wireless mesh network products have been developed. These networks, which often use the 802.xx wireless standards (e.g. 802.11), involve a number of antenna arrangements which each provide an Access Link (AL) to users of the network and also Transit Links (TLs) which are used to pass information between the antenna arrangements which are arranged in a mesh or tree configuration. One such network is described in U.S. patent application Ser. No. 10/683,408; filed Oct. 10, 2003 incorporated herein by reference and an example antenna arrangement is described in U.S. patent application Ser. No. 10/683,301; filed Oct. 10, 2003 also incorporated herein by reference.

Traffic may stay within the mesh network, but more commonly, one or more of the antenna arrangements in the mesh network are connected to an external network, to allow users of the mesh networks to communicate with users of other networks, to access the internet etc. The antenna arrangement connected to the external network is referred to herein as a 'data sink'.

In order to provide satisfactory performance, the antenna arrangements must be deployed such that suitable coverage is provided to users via access links and also that high quality transit links exist between the antenna arrangements. Furthermore, the network topology should be arranged such that it is resilient to node and/or link failure and additionally that the link capacity provided is well matched to the traffic levels on each particular link.

At the moment, considerable radio frequency (RF) engineering experience is required in order to assess the quality of a mesh network topology. However, many of the new wireless mesh network products are intended for rapid and simple deployment by non-RF experts.

OBJECT TO THE INVENTION

The invention seeks to provide methods of evaluating mesh networks which mitigates at least one of the problems of known methods.

SUMMARY OF THE INVENTION

The invention provides methods and apparatus for determining the quality of a mesh network. Advantageously this enables non-RF experts to plan a network, to determine the quality of the network and identify problem areas/nodes/links and mitigate these problems before a network is deployed.

The method may be performed by software in machine readable form on a storage medium.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will now be described with reference to the accompanying drawings in which.

Common reference numerals are used throughout the figures where appropriate.

DETAILED DESCRIPTION OF INVENTION

Embodiments of the present invention are described below by way of example only. These examples represent the best ways of putting the invention into practice that are currently known to the Applicant although they are not the only ways in which this could be achieved.

As described above, designing a well provisioned and robust mesh network is a complex process requiring significant skill and experience. However, some mesh network products are intended for rapid deployment by non-radio experts. Issues that may need to be taking into account to ensure mesh networks perform well and are robust against failure include:

The capacity of the radio links (in bits per second) varies depending on the propagation over the link. Longer links tend to have lower capacities.

There is a limited radio spectrum resource, so it must be used efficiently.

The failure rate of links is significantly higher than would be expected in wired networks. It is always possible that links can be blocked by new buildings or extreme weather. Some redundancy should be built in to allow for such eventualities.

The invention provides a number of evaluation methods and metrics which provide an indication of the robustness of the network and an indication of how well provisioned the network is. When displayed on a topological diagram, the methods and metrics can reveal the problem areas/links/nodes within the network and enable the user to adjust the network topology and see the effect on the quality of the network.

Figure 1:
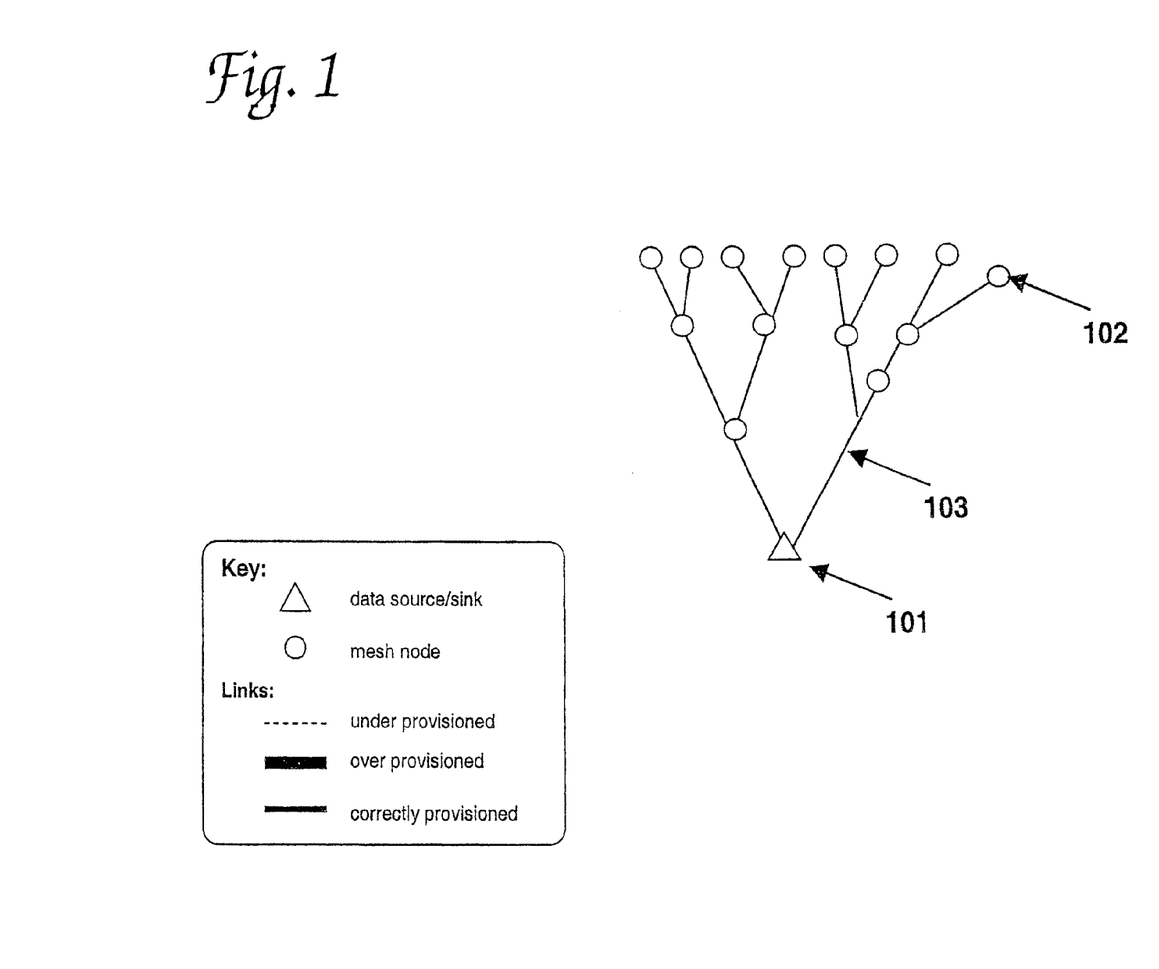
FIG. 1 is a schematic diagram of a mesh network.

FIG. 1 is a simple schematic diagram of a mesh network comprising a single data sink 101 connected to a number of nodes 102 by wireless links 103.

Link Provisioning

According to a first aspect of the present invention, there is provided a method of evaluating the quality of link provisioning in a network, which may be a wireless mesh network, i.e.

the method evaluates how well the capacity provided for the link corresponds with the actual traffic requirement of that link. The link provisioning evaluation method will identify potential bottlenecks in the network and enable them to be addressed prior to installation of the network.

In order to evaluate link provisioning, it is necessary to have information relating to the traffic flow on each link. This may be provided from measurements or may be estimated using a model. A simple model is used by way of example here, where the same amount of traffic (a unit of one) is gathered at each node and is forwarded towards the data sink.

It is also necessary to have information on link capacity, this is the amount of traffic that a link can carry per unit time and is affected by link length, environment of the link, interference etc.

Figure 2:
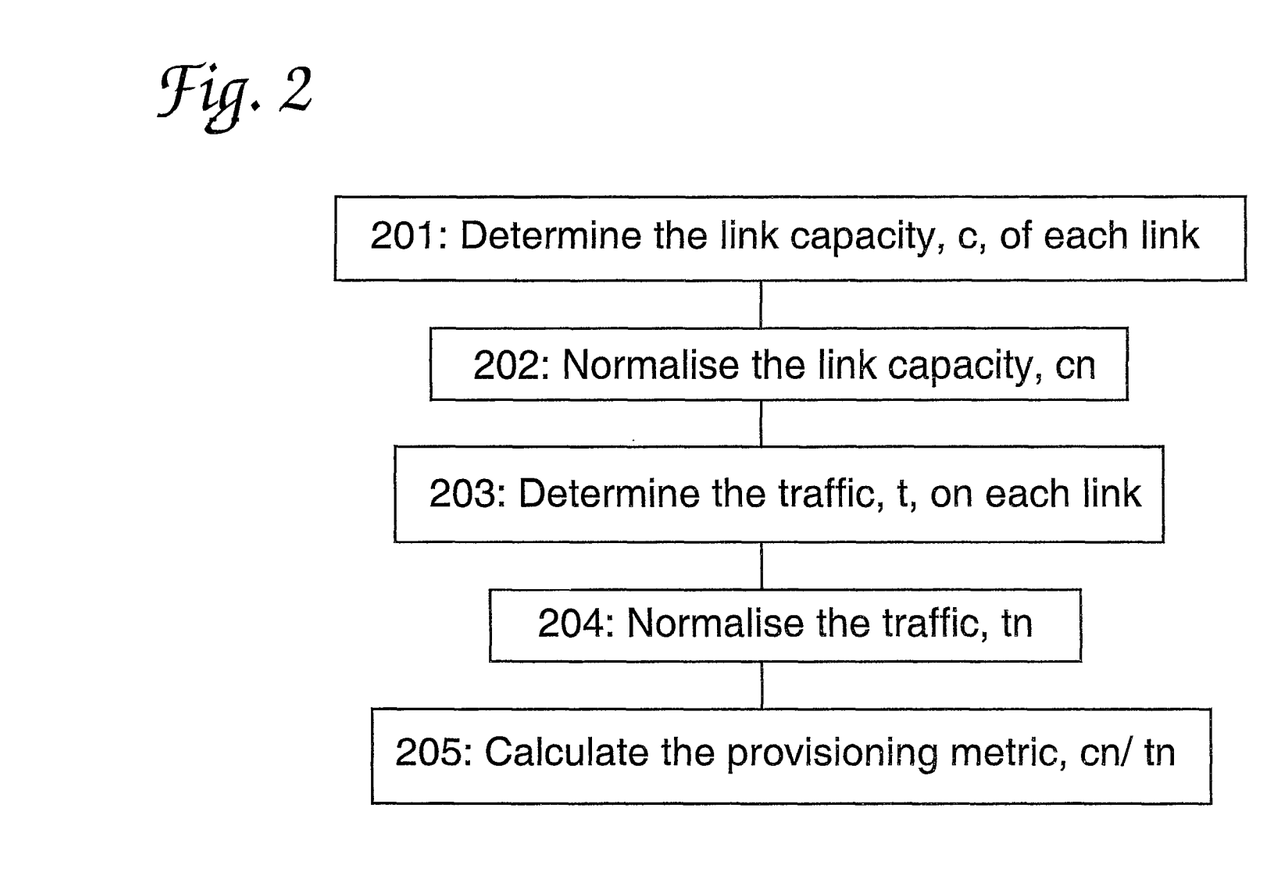
FIG. 2 is an example flow diagram of a link provisioning evaluation method.

FIG. 2 is an example flow diagram of the link provisioning evaluation method.

Figure 3:
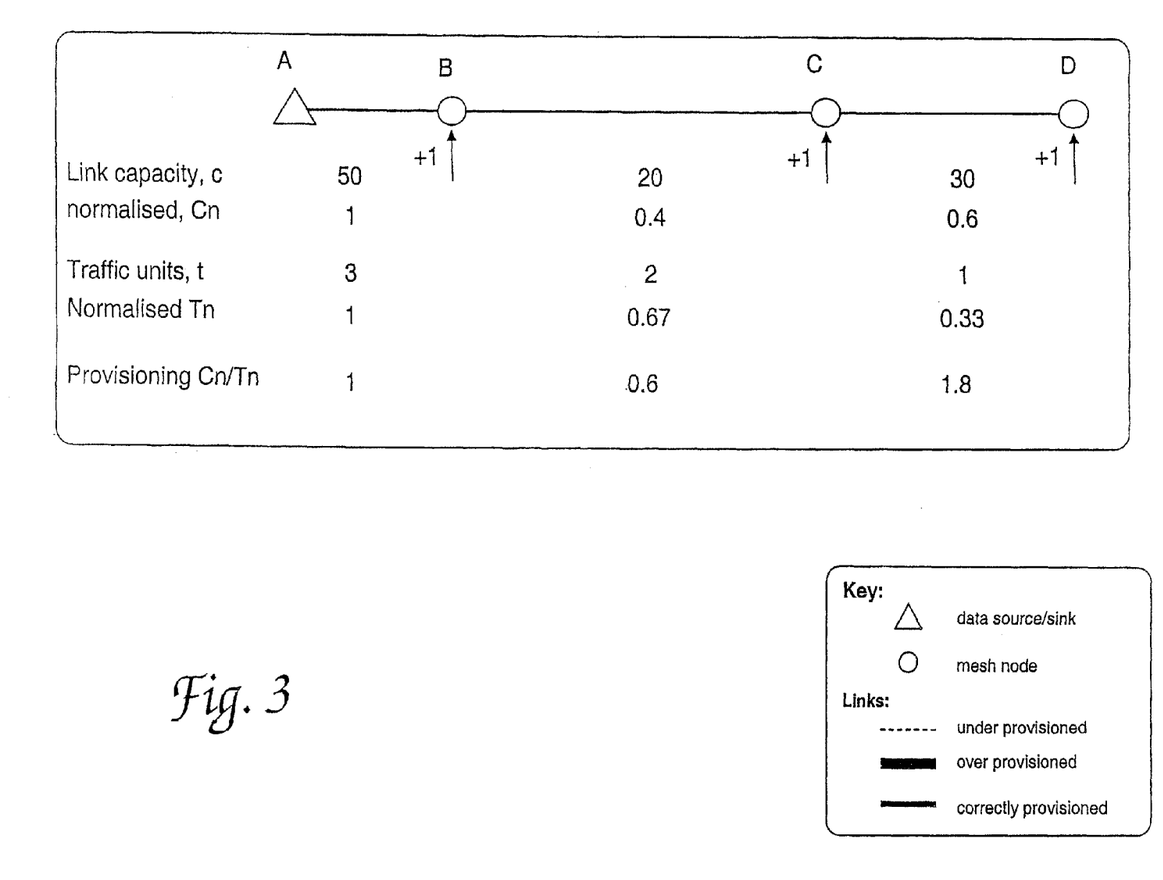
FIG. 3 illustrates the method of FIG. 2.

201: Determine the link capacity, c, of each link
202: Normalise the link capacity, $c_n$
203: Determine the traffic, t, on each link
204: Normalise the traffic, $t_n$
205: Calculate the provisioning metric, $c_n/t_n$ An example of this process is shown in FIG. 3, for the network containing a data source/sink A and network nodes B-D, and the calculations are shown in the table below:

|  | Link A-B | Link B-C | Link C-D |
|---|---|---|---|
| Link capacity, c | 50 | 20 | 30 |
| Normalised link capacity, $c_n$ | 1 | 0.4 | 0.6 |
| Traffic, t | 3 | 2 | 1 |
| Normalised traffic, $t_n$ | 1 | 0.67 | 0.33 |
| Provisioning, $c_n/t_n$ | 1 | 0.6 | 1.8 |

Where the provisioning metric, $c_n/t_n$ is greater than 1, the link is over provisioned (e.g. link C-D), whereas where the provisioning metric is less than 1, the link is under provisioned (e.g. link B-C).

Figure 4:
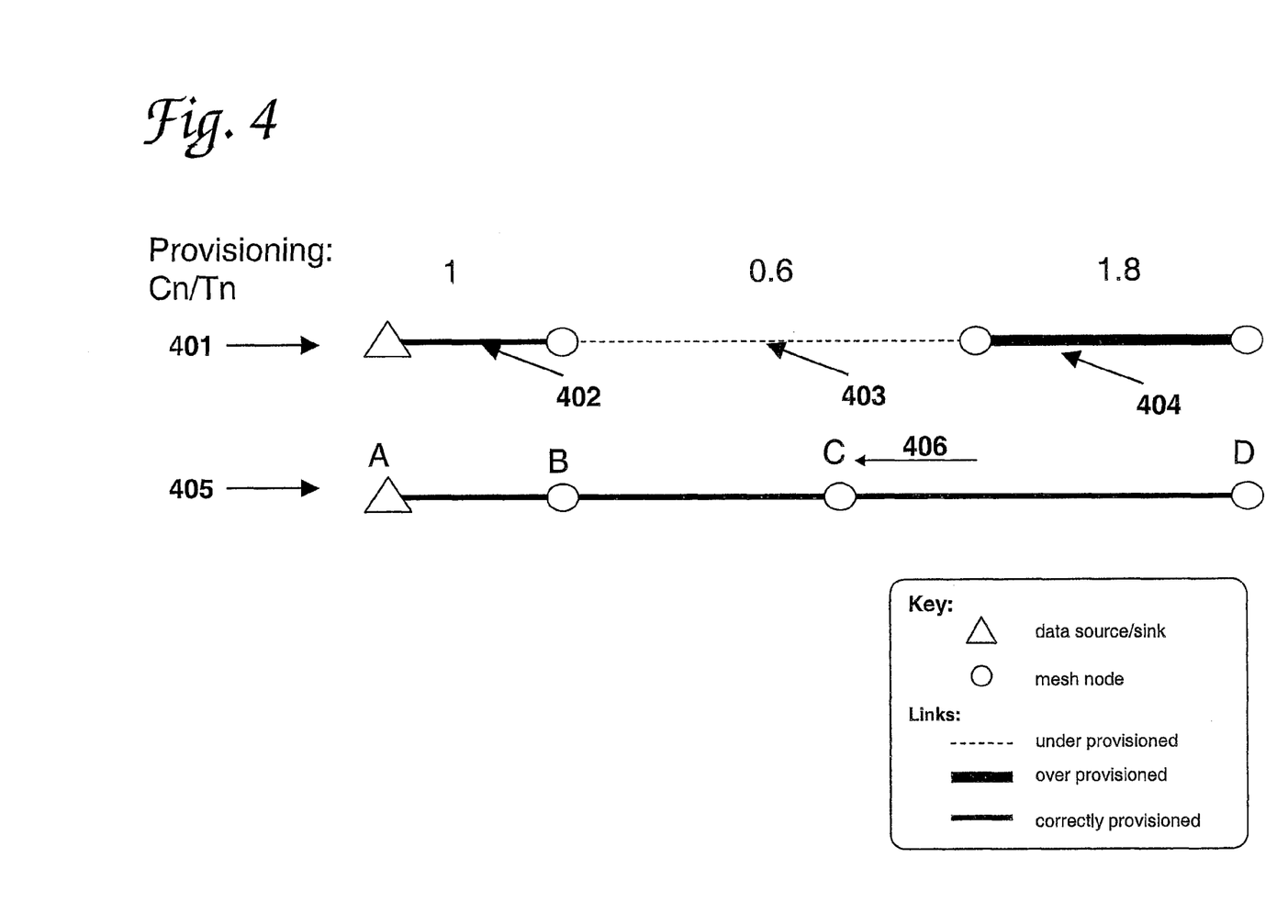
FIG. 4 shows a graphical representation of the method of FIG. 2.

This provisioning data can then be displayed graphically, with the thickness/nature of the lines indicating whether the link is under or over provisioned, as shown in FIG. 4. The top representation 401 shows the situation from FIG. 3, as detailed in the table above. The well provisioned link from A-B where $c_n/t_n=1$, is shown by a narrow solid line 402. The under provisioned link ($c_n/t_n<1$) from B-C is shown by a dotted line 403, indicating the potential bottleneck in the network, and the over provisioned link ($c_n/t_n>1$) from C-D is shown by a thick solid line 404.

The bottom representation 405 in FIG. 4 shows how, when presented with the information identifying a potential bottleneck from B-C, this can be addressed by moving C closer to B (shown by arrow 406). This increases the capacity of the link between B and C whilst decreasing the capacity of the link between C and D and therefore provides more even provisioning across the whole network.

Figure 5:
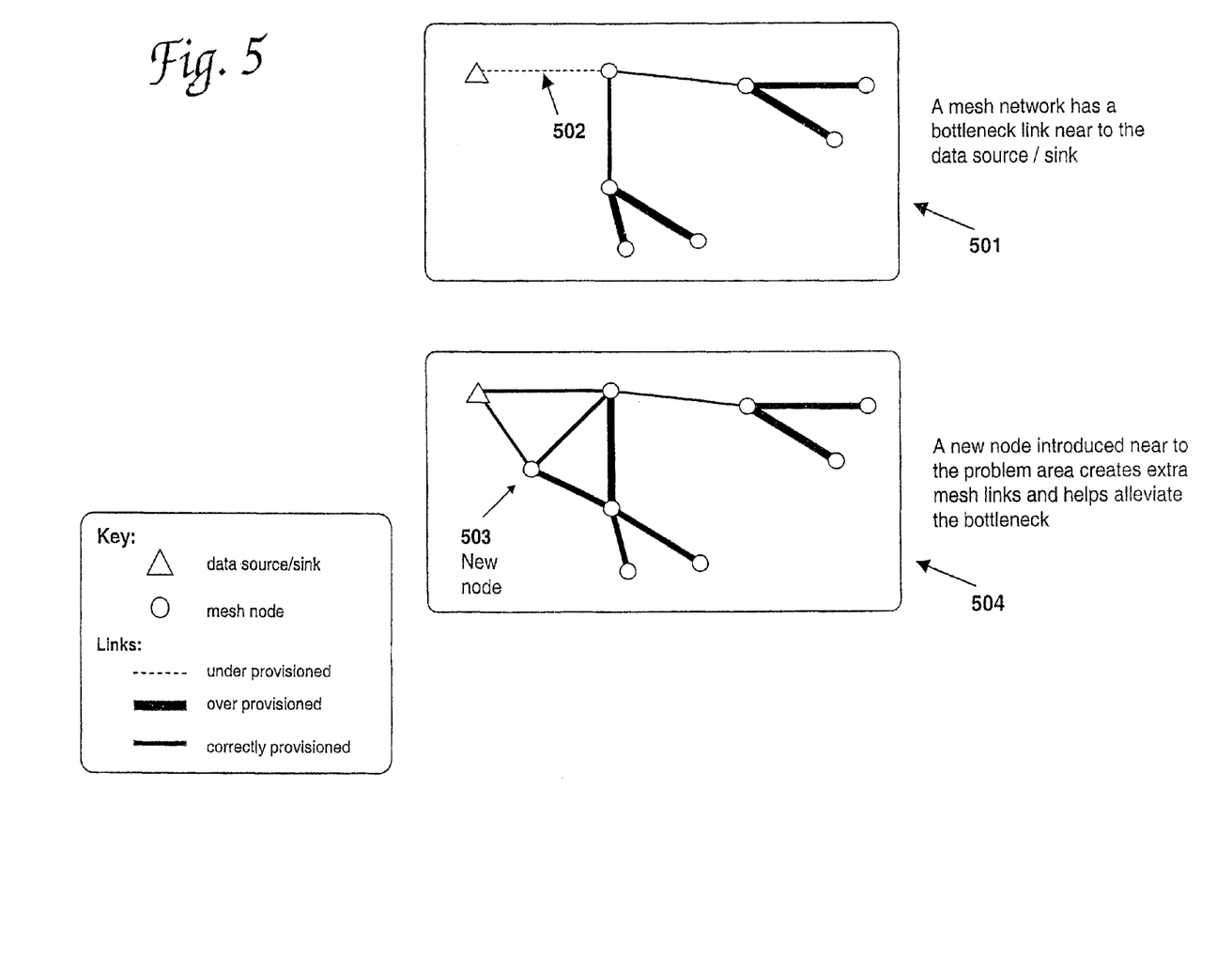
FIG. 5 shows a graphical representation of the output of the method of FIG. 2 when applied to a mesh network.

Although the network shown in FIGS. 3 and 4 is a simple linear network, this is shown by way of example only and the technique can be applied to other networks, such as mesh networks, for example that shown in FIG. 1. An example of how this can be used in a mesh network is shown in FIG. 5. The first network 501 can be clearly seen to have a bottleneck link 502 close to the data source/sink. This can be improved by adding a new node 503 as shown in the second network 504.

As described above, this example used a simple traffic model. More complicated methods of determining traffic could be used, and additionally where traffic has more than one route from a node back to the data sink, routing techniques could also be incorporated (e.g. OSPF or waterpour) to determine which route the traffic would select.

Link Criticality

According to a second aspect of the present invention, there is provided a method of evaluating the link criticality. This evaluates the importance of each link within the network to the proper functioning of the network and the level of impact to the network should that link fail.

Figure 6:
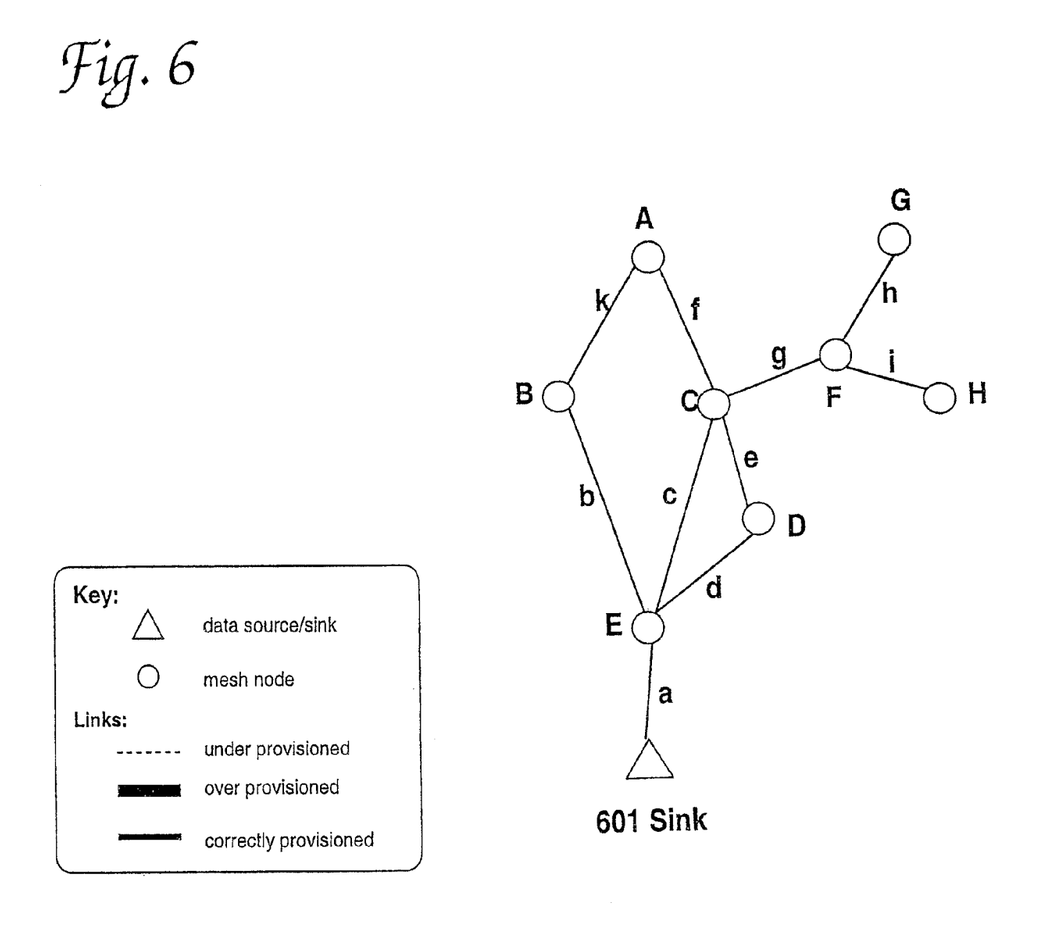
FIG. 6 shows a schematic diagram of a mesh network.

FIG. 6 shows an example mesh network containing 8 nodes A-H and a data sink (601 Sink) connected by 10 links a-k (minus j).

In order to evaluate the link criticality, it is necessary to determine a cost for each link. For the purposes of this explanation, a simple cost of 1 is assigned to each link a-k (i.e. simply determining the number of hops). However, alternative costs could be used, and another cost determination technique would be to use:

$$Cost = \frac{1}{DataRate}$$

Alternatively link costs could be based on one or more of traffic demand, capacity, provisioning (as defined above), routing diversity, error rates, modulation ratios, interference etc.

Figure 7:
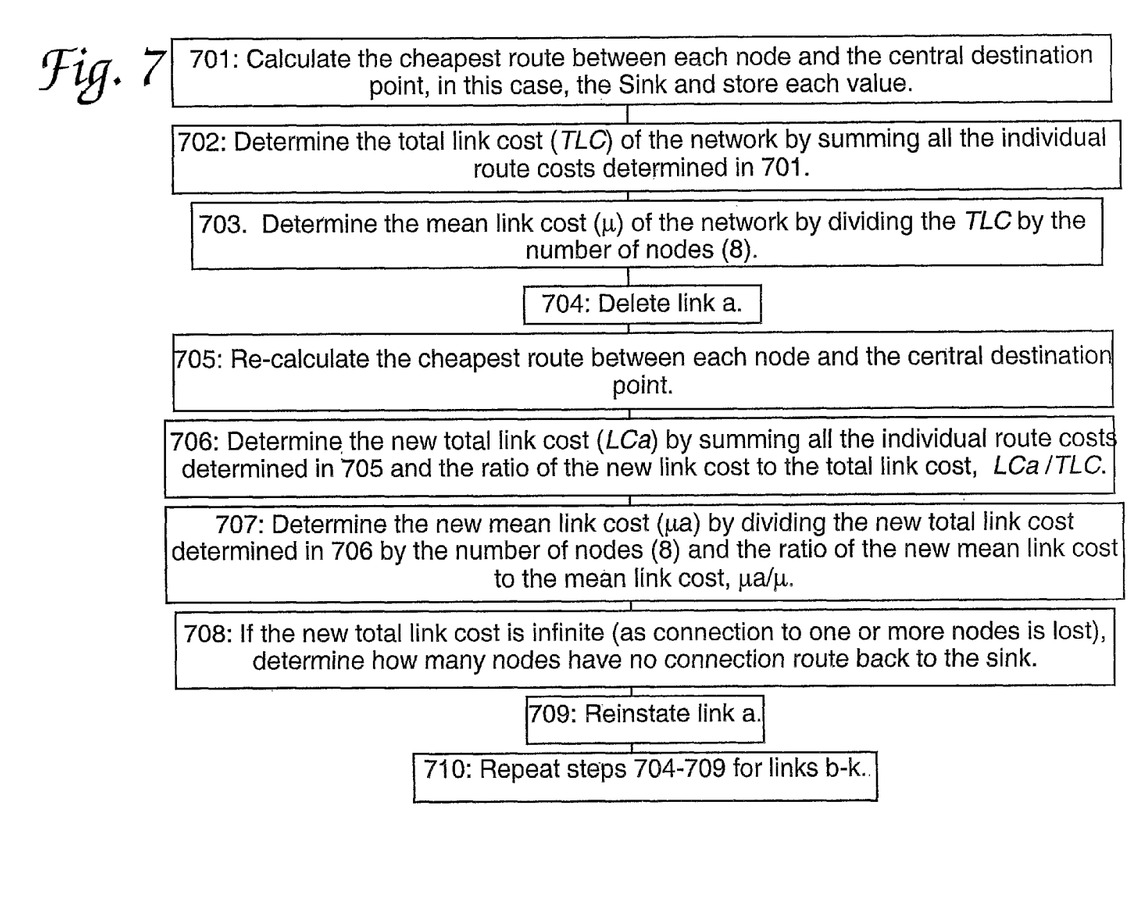
FIG. 7 shows an example flow diagram of the link criticality evaluation method.

FIG. 7 shows an example flow diagram of the link criticality evaluation method:

701: Calculate the cheapest route between each node and the central destination point, in this case, the Sink 601 and store each value:

$$A=3, B=2, C=2, D=2, E=1, F=3, G=4, H=4$$

702: Determine the total link cost (TLC) of the network by summing all the individual route costs determined in 701.

$$TLC=21$$

703. Determine the mean link cost ($\mu$) of the network by dividing the TLC by the number of nodes (8).

$$\mu=21/8=2.625$$

704: Delete link a.

705: Re-calculate the cheapest route between each node and the central destination point.

706: Determine the new total link cost ($LC_a$) by summing all the individual route costs determined in 705 and determine the ratio of the new link cost to the total link cost, $LC_a/TLC$.

707: Determine the new mean link cost ($\mu_a$) by dividing the new total link cost ($LC_a$) by the number of nodes (8) and determine the ratio of the new mean link cost to the mean link cost, $\mu_a/\mu$.

708: If the new total link cost is infinite (as connection to one or more nodes is lost), determine how many nodes have no connection route back to the sink (i.e. how many nodes are now isolated from the network).

709: Reinstate link a.

710: Repeat steps 704-709 for links b-k.

The results for the network shown in FIG. 6 are given in the table below:

| Link (x) | Shortest route lengths | | | | | | | | $LC_x$ | $\mu_x$ | $LC_x$/TLC | No. of isolated nodes |
|---|---|---|---|---|---|---|---|---|---|---|---|---|
| | A | B | C | D | E | F | G | H | | | | |
| a | ∞ | ∞ | ∞ | ∞ | ∞ | ∞ | ∞ | ∞ | ∞ | ∞ | ∞ | 8 = 100% |
| b | 3 | 4 | 2 | 2 | 1 | 3 | 4 | 4 | 23 | 2.875 | 1.095 | 0 |
| c | 3 | 2 | 3 | 2 | 1 | 4 | 5 | 5 | 25 | 3.125 | 1.190 | 0 |
| d | 3 | 2 | 2 | 3 | 1 | 3 | 4 | 4 | 22 | 2.750 | 1.048 | 0 |
| e | 3 | 2 | 2 | 2 | 1 | 3 | 4 | 4 | 21 | 2.625 | 1 | 0 |
| f | 3 | 2 | 2 | 2 | 1 | 3 | 4 | 4 | 21 | 2.625 | 1 | 0 |
| g | 3 | 2 | 2 | 2 | 1 | ∞ | ∞ | ∞ | ∞ | ∞ | ∞ | 3 = 37.5% |
| h | 3 | 2 | 2 | 2 | 1 | 3 | ∞ | 4 | ∞ | ∞ | ∞ | 1 = 12.5% |
| i | 3 | 2 | 2 | 2 | 1 | 3 | 4 | ∞ | ∞ | ∞ | ∞ | 1 = 12.5% |
| k | 3 | 2 | 2 | 2 | 1 | 3 | 4 | 4 | 21 | 2.625 | 1 | 0 |

Note that if the loss of a link results in one or more nodes being isolated, the remaining nodes which are not isolated do not suffer any effects of the link loss.

From the above results, it is easy to determine the relative criticality of links in the network. The links can be divided into three classes:

Critical links: $LC_x$/TLC=∞

Important links: $LC_x$/TLC>1

Diversity links: $LC_x$/TLC=1

Critical links are links which when lost, result in one or more nodes being isolated from the network (i.e. failure of critical links causes a quantified loss in network connectivity). The degree of criticality can be determined by the number (or percentage) of nodes which lose connection on the loss of the link, or alternatively the degree of criticality could be determined from the amount of traffic lost when the link is lost.

Important links are links, the loss of which results in an increase in cost to the network (i.e. failure of important links causes a quantified degradation in network performance). However, when one of these links is lost, all the nodes are still able to communicate with the central destination point or data sink.

Diversity links are links which although they don't result in a change in network metric on failure, provide a back-up or protection path against failure of another link. The existence of diversity links reduces the number and/or severity of critical/important links. Some of these diversity links may not be heavily used for normal traffic and are only really used when another link fails. For example, links k and f are both diversity links and one of these links may not normally be used for traffic (e.g. link f), however, if either link was not present, then the remaining link would be a critical link because loss of the link would result in node A losing connection to the network, (node A becomes isolated). Link 'e' is also another example of a 'diversity' link. In normal operation it wouldn't carry any traffic at all.

The above discussion in relation to FIGS. 6 and 7 showed a number of suitable metrics for evaluating link criticality, including: total link costs ($LC_x$), ratios of total link costs, ($LC_x$/TLC), mean link costs ($\mu_x$), ratios of mean link costs ($\mu_a/\mu$) and numbers of nodes where connectivity lost. It is not necessary to calculate all of these metrics and one may be sufficient. Furthermore, variants on the metrics may also be evaluated in addition or instead, such as incremental link cost ($LC_x$−TLC), total path length increase for nodes which are not isolated etc.

The criticality of a particular link could be represented to a planner via a graphical user interface (GUI) by use of different colour lines to represent different degrees of criticality.

Node Criticality

According to a third aspect of the present invention, there is provided a method of evaluating the node criticality. This evaluates the importance of each node within the network to the proper functioning of the network and the level of impact to the network should that node fail.

Node criticality can be assessed using the same process as for evaluating link criticality, except that in steps 704-709, each node is deleted in turn and the impact on the network evaluated. It should be noted that when evaluating changes to total link cost, the costs associated with the deleted node need to be removed.

The criticality of a particular node could also be represented to a planner via a graphical user interface (GUI) by use of different colour or different size circles to represent different degrees of criticality.

In the above processes of evaluating node and link criticality, only the cost of each link was included. However, it may be beneficial in some networks to include a node cost when determining the cost of routes back to the central destination point (e.g. data sink).

Node costs may be based on criteria such as the number of possible links back from that node to the data sink, the traffic passing through the node, the capacity for traffic handling of the node, how many nodes that node is connected to etc.

This may change the selection of the shortest route, for example, referring back to FIG. 6, for traffic travelling from node A to the sink, there are two shortest routes, when only looking at link costs:

$A$–$B$–$E$–Sink=3 links $A$–$C$–$E$–Sink=3 links

If it is assumed, by way of example only, that the cost of each link is 1 and the cost of each node is the number of nodes connected to it, the two routes no longer have the same cost:

Cost($A$–$B$–$E$–Sink)=3 links+node $B$+node $E$=3+2+4=9

Cost($A$–$C$–$E$–Sink)=3 links+node $C$+node $E$=3+4+4=11

It will be understood that the above description of a preferred embodiment is given by way of example only and that various modifications may be made by those skilled in the art without departing from the spirit and scope of the invention.

The invention claimed is:

1. A method of determining the quality of a network comprising a plurality of access nodes supporting wireless communications both with user terminals and between themselves, the method comprising the steps of:
   storing information relating to the access nodes, the information including whether or not each access node is a data sink;
   determining measures of traffic flow on wireless links between a plurality of said access nodes;
   determining measures of capacity on the wireless links of the plurality of said access nodes; and
   determining the quality of the network in dependence on the stored information, the measures of traffic flow, and the measures of capacity, wherein determining the quality of the network comprises:
   for each wireless link of the plurality of said access nodes:
      determining a normalized traffic flow of the respective wireless link based on the measures of traffic flow;
      determining a normalized capacity of the respective wireless link based on the measures of capacity; and
      determining a provisioning metric of the respective wireless link that is based on a ratio of the normalized capacity to the normalized traffic flow; and
   comparing the provisioning metrics of the wireless links.

2. The method according to claim 1, wherein the measures of traffic flow are obtained from measurement of the network.

3. The method according to claim 1, wherein the measures of traffic flow are estimated using a model of the network.

4. The method according to claim 1, wherein the measures of capacity are obtained from measurement of the network.

5. The method according to claim 1, wherein the measures of capacity are estimated using a model of the network.

6. The method according to claim 1, wherein the determined quality of the network comprises information on over or under provisioning of capacity on the wireless links.

7. The method according to claim 1, wherein the determined quality of the network comprises information on a degree of importance of wireless links or access nodes of the network.

8. The method according to claim 6, comprising the step of:
   displaying in graphical form the information on the over or under provisioning of capacity on the wireless links.

9. The method according to claim 7, wherein the degree of importance of a certain wireless link is determined by:
   calculating a measure of link cost of the network assuming that the certain wireless link is not operational.

10. The method according to claim 7, wherein the degree of importance of a certain access node is determined by:
    calculating a measure of link cost of the network assuming that the certain access node is not operational.

11. The method of claim 1, wherein determining the quality of the network comprises, for each wireless link between the plurality of access nodes, determining a normalized link cost for the respective wireless link.

12. A non-transitory, computer accessible memory medium storing program instructions for determining the quality of a network comprising a plurality of access nodes supporting wireless communications both with user terminals and between themselves, wherein the program instructions are executable to:
   store information relating to the access nodes, the information including whether or not each access node is a data sink;
   determine measures of traffic flow on wireless links between a plurality of said access nodes;
   determine measures of capacity on the wireless links of the plurality of said access nodes; and
   determine the quality of the network in dependence on the stored information, the measures of traffic flow, and the measures of capacity, wherein, in determining the quality of the network, the program instructions are executable to:
   for each wireless link of the plurality of said access nodes:
      determine a normalized traffic flow of the respective wireless link based on the measures of the traffic flow;
      determine a normalized capacity of the respective wireless link based on the measures of capacity; and
      determine a provisioning metric of the respective wireless link that is based on a ratio of the normalized capacity to the normalized traffic flow; and
   compare the provisioning metrics of the wireless links.

13. The non-transitory, computer accessible memory medium of claim 12, wherein the measures of traffic flow are obtained from measurement of the network.

14. The non-transitory, computer accessible memory medium of claim 12, wherein the measures of traffic flow are estimated using a model of the network.

15. The non-transitory, computer accessible memory medium of claim 12, wherein the measures of capacity are obtained from measurement of the network.

16. The non-transitory, computer accessible memory medium of claim 12, wherein the measures of capacity are estimated using a model of the network.

17. The non-transitory, computer accessible memory medium of claim 12, wherein the determined quality of the network comprises information on over or under provisioning of capacity on the wireless links.

18. The non-transitory, computer accessible memory medium of claim 17, comprising the step of:
   displaying in graphical form the information on the over or under provisioning of capacity on the wireless links.

19. The non-transitory, computer accessible memory medium of claim 12, wherein the determined quality of the network comprises information on a degree of importance of wireless links or access nodes of the network.

20. The non-transitory, computer accessible memory medium of claim 19, wherein the degree of importance of a certain wireless link is determined by calculating a measure of link cost of the network assuming that the certain wireless link is not operational.

21. The non-transitory, computer accessible memory medium of claim 19, wherein the degree of importance of a certain access node is determined by calculating a measure of link cost of the network assuming that the certain access node is not operational.

22. The non-transitory, computer accessible memory medium of claim 12, wherein determining the quality of the network comprises, for each wireless link between the plurality of access nodes, determining a normalized link cost for the respective wireless link.

* * * * *